United States Patent

[11] 3,545,331

| [72] | Inventor | George A. Tinnerman<br>Lakewood, Ohio (3600 Stewart Ave.,<br>Miami, FL 33133) |
|---|---|---|
| [21] | Appl. No. | 723,163 |
| [22] | Filed | April 22, 1968 |
| [45] | Patented | Dec. 8, 1970 |

[54] PREFORMED GROOVE CUTTING FASTENER STRUCTURE
8 Claims, 7 Drawing Figs.

[52] U.S. Cl. .................................................. 85/32; 10/86
[51] Int. Cl. .................................................. F16b 37/00
[50] Field of Search .................................. 85/32(Int.); 10/86, 86F; 151/20, 34

[56] References Cited
UNITED STATES PATENTS

| 2,832,972 | 5/1958 | Richards | 85/32 |
| 3,160,189 | 12/1964 | Hughes | 85/32 |
| 3,345,899 | 10/1967 | Fiddler | 85/32Int. |
| 3,368,444 | 2/1968 | Holton | 85/32Int. |
| 723,419 | 3/1903 | Stinson | 151/34 |

FOREIGN PATENTS

| 870,904 | 6/1961 | Great Britain | 151/34 |

Primary Examiner—Edward C. Allen
Attorneys—Revere B. Gurley and Arthur H. Van Horn ABSTRACT: A fastener structure is formed by swaging groove cutting or self-tapping ribs or threads in the wall of an aperture, so the ribs will cut a groove or grooves in a stud rotated in the aperture. The walls surrounding the aperture are first deformed to provide helicoidal surfaces bordering the end of the aperture, and the wall is then swaged from the inclined edge to form a rib or thread from each surface of uniform height, or tapering in height according to the angle of the helicoidal surfaces.

The ribs may be formed at each end of the aperture, and the ribs or threads may also be formed to lie on the same helical path, so that the fastener may cut a single groove on a smooth shank or may engage a threaded shank.

PATENTED DEC 8 1970
3,545,331
FIG. 1
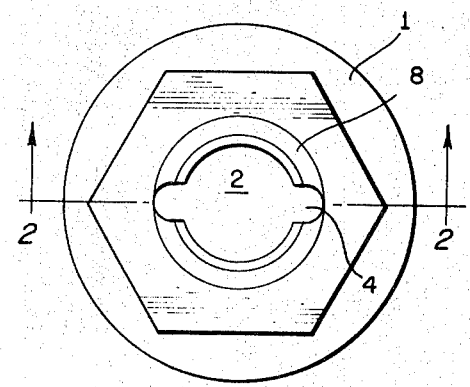
FIG. 2
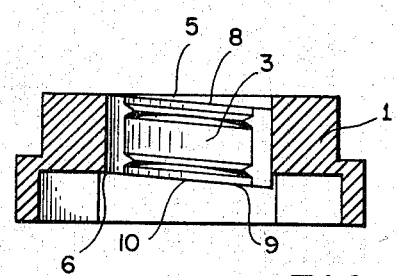
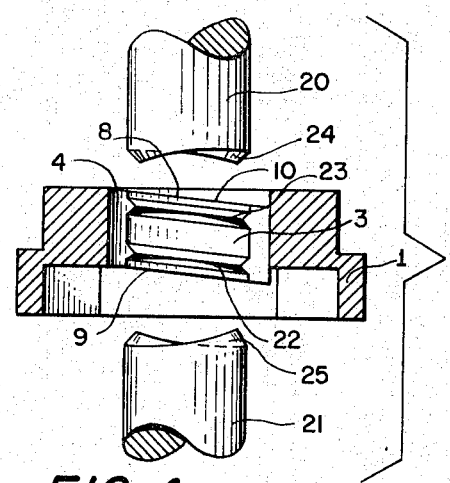
FIG. 4
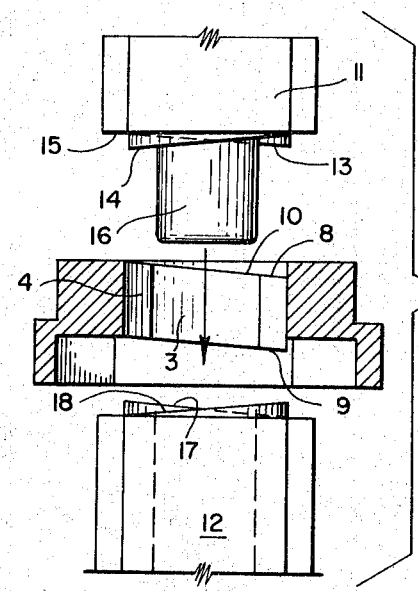
FIG. 3
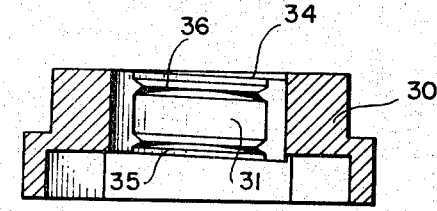
FIG. 6
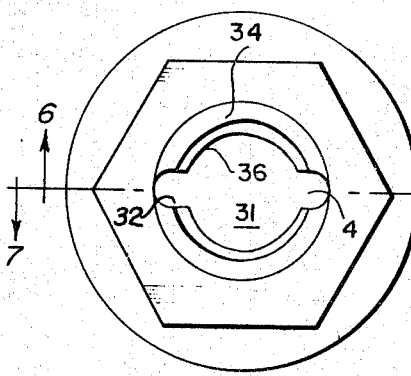
FIG. 5
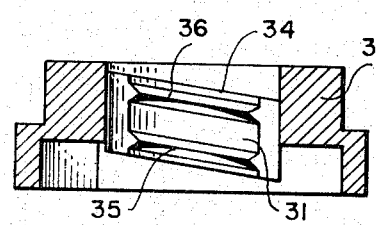
FIG. 7
INVENTOR
GEORGE A. TINNERMAN
BY Revere B. Gurley
ATTORNEY

3,545,331

PREFORMED GROOVE CUTTING FASTENER STRUCTURE

NATURE AND OBJECTS OF INVENTION

This invention relates to a type of fastener sometimes known as a thread cutting nut, in which a female member has threads or ribs on the wall of its aperture which cut a groove or grooves in a smooth male shank when it is rotated in said aperture. The nut may be formed with punches or dies in a stamping operation, simplifying and reducing the expense of manufacture.

It is an object of this invention to form groove-cutting ribs or threads on the wall of the aperture of a female fastener structure of any desired thickness and radial height, independently of the angle or pitch of the thread. Before this invention, when threads were swaged from the wall of an aperture, these threads increased in height or thickness with the distance from the end of the aperture, so the thread was tapered or nonuniform from one end to the other. This invention now allows the threads or ribs to be formed of uniform thickness or height, if desired, or of any desired taper. These ribs or threads are formed with their ends acting as cutting teeth to cut a groove in a shank rotated in the aperture, the walls of the aperture being formed to allow escape of the cuttings.

A fastener structure according to this invention, which is an improvement of the fastener structure shown in application Ser. No. 640,213, filed May 22, 1967, is first preformed to provide inclined, helicoidal surfaces bordering the aperture, so that the edges of the aperture are inclined in the same sense as the threads will be formed. Next, punches swage or shave the wall axially inwardly of each helical edge to form a helical rib spaced from the edge. If the helical angle of the punch is the same as that of the edge of the aperture, the metal will be displaced uniformly along the edge and the rib or thread formed will be uniform in radial height from end to end. A rib or thread varying in height may be formed by employing a punch having a different helical angle than the edge of the aperture, so that a tapering thread is formed.

A nut may have preformed helicoidal surfaces on both transverse faces and sets of ribs or threads formed from each face, with the ribs or threads at one end of the aperture lying in the same helical paths as those at the other end, so that the ribs follow in the same grooves.

DRAWINGS

In the drawings:

FIG. 1 is a top plan view of a fastener according to this invention;

FIG. 2 is an axial cross section on line 2—2 of FIG. 1;

FIG. 3 illustrates a preliminary or preform stage in manufacture of the fastener;

FIG. 4 illustrates the final stage in manufacture of the fastener;

FIG. 5 is a top plan view of a modification of the fastener according to this invention;

FIG. 6 is an axial cross section taken in direction of the arrows 6—6 of FIG. 5; and FIG. 7 is an axial cross section taken in the opposite direction of FIG. 6 as indicated by arrows 7—7 of FIG. 5.

DESCRIPTION

The fastener structure of this invention is embodied in the nut element 1, as shown in FIGS. 1 and 2. This nut element has an aperture 2 therein which has generally cylindrical wall portions 3 separated by discontinuities or slots 4. Each transverse face 5 or 6 has a helicoidal surface 8 or 9 bordering the wall to provide a helical edge 10 inclined axially and circumferentially at the end of the wall.

These helicoidal surfaces 8, 9 are formed initially in a preliminary or preform stage, as shown in FIG. 3. After the aperture has been punched in the nut element 1, it is placed between the two dies 11, 12, which approach each other to stamp the preform of the nut. The upper die 11 has opposite helicoidal surfaces 13, 14, the surface 13 forming the helicoidal surface 8 on the preform shown in FIG. 3. This die 11 also has a flat circular shoulder 15 which limits its movement toward the nut. The pin 16 enters the aperture of the nut to center the die on the nut.

The lower die 12 has helicoidal surfaces 17, 18 which are similar to the surfaces 13, 14 on the upper die, the surface 17 forming the surface 9 on the nut shown in FIG. 3. This die also is apertured centrally to receive the pin 16 of the upper die.

This preform shown in FIG. 3 is next placed between punches 20, 21 to form helical ribs or threads 22, 23 on the cylindrical wall portions 3 between the discontinuities 4. The diameter of these punches is larger than the diameter of the aperture 2, so that these punches swage or shave the wall portions 3 at each end of the aperture 2 to form the ribs or threads 22, 23 between the discontinuities 4 by displacing the metal of the wall portions.

The surfaces 24, 25 on the ends of the punches are helicoidal and are at the same angle relative to the axis of the aperture, so that the ribs or threads on opposite ends lie on the same or parallel curves. If the preform helicoidal surfaces 8, 9 are at the same angle, each of the surfaces 24, 25 of the punches will engage the walls of the nut element along the entire edge simultaneously, and the rib or thread will be of uniform thickness or height throughout its length.

In some instances, it has been found that it is advantageous to form a tapering rib. For example, the primary thread or rib 22 which engages the shank initially may increase in radial height from its leading end. This formation will result from providing a helicoidal surface on the preform at a different angle than that of the punch. The face of the punch will then engage the edge of the wall of the nut and start to swage the thread at one end and will progressively engage the wall as it moves axially. The material will be displaced according to the distance the punch travels, and the resulting rib 22 will increase in thickness from end to end.

The ribs 22 and 23 at the opposite ends of the walls are spaced a multiple of one-half the pitch distance, so that each rib 23 will follow in a groove cut by one of the ribs 22. These ribs 23 may, if desired, be formed of different height from the ribs 22 to cut a deeper groove, or either of the ribs also may be formed to taper or increase in height from the leading end, as described above.

In this form of the invention, the helicoidal surfaces 8 or 9 at each end are shown as displaced equal distances from the flat end surface, and the ribs or threads are also equal distances from the end. When rotated on a smooth stud, the ribs at one end will cut two grooves spaced apart one-half the pitch distance of the threads. The leading end of each rib 8 or 9 at its intersection with the discontinuity 4 acts as a tooth to cut the groove, and the rib of the same height follows in the groove. The discontinuity or slot provides space for the cuttings, avoiding jamming the nut by these cuttings. The nut shown is provided with the usual hexagonal wrench seat and is recessed to accommodate a plastic sealing washer or other sealing means.

In the form of the invention shown in FIGS. 5 to 7, the fastener is formed with ribs or threads which lie in a single helical path and cut a single groove, corresponding to the thread on a tapped nut or die. The nut 30 has an aperture 31 formed with one or more discontinuities 32 and the border of this aperture is stamped to form a single helicoidal surface 33 or 34 at each end. Thus the surface 34 at one side as shown in FIG. 6 is depressed slightly, while the surface 34 on the opposite side is depressed an additional one-half the pitch distance.

The ribs 35, 36 at the opposite ends are formed by punches of corresponding form as in the first modification, and are spaced a multiple of the whole pitch distance. In this way, the ribs at one end cut a single groove and the ribs at the opposite end follow in the same groove. The initial or primary ribs 35 may be formed at an angle to the helicoidal surface 33, so as to taper in thickness or radial height, or the ribs 35 and 36 at opposite ends may be of different radial heights, the secondary ribs 36 cutting the groove deeper after it is cut initially by the primary ribs 35.

The ribs or threads 35, 36 lying in a single, helical path provide in effect a single, interrupted thread and lessen the torque required since only a single groove is cut. These ribs may be designed to correspond to a standard thread and the fastener may then be applied to a threaded stud as well as used as a thread cutting nut. Such a nut is thus universally applicable either to cut a thread in a smooth stud or to engage a standard threaded stud.

The leading ends of the ribs or threads 22, 23 or 35, 36 in both embodiments act as cutting teeth to cut a groove in a smooth shank rotated therein. The ribs may be uniform in height, if desired, and avoid excessive pressure on the trailing end of the rib. If a slight taper is desired, the ribs may be tapered to increase pressure and to deepen the groove. Other variations in height of the ribs may be developed to conform to other characteristics of torque and clamping force which are needed to meet special conditions. It will also be apparent that the order of the steps of deforming the end faces and swaging the ribs may, in some instances, be reversed, so the ribs are formed circular and the wall is then deformed to produce the helical configuration.

The embodiments of the invention described and illustrated are examples of the invention which is defined to cover all modifications that are within the scope of the appended claims.

I claim:

1. A female fastener structure having an aperture for rotatably receiving a shank, an end face transverse to said aperture having an outer surface spaced radially from said aperture and a helicoidal surface bordering said aperture radially inward of said outer surface, the wall of said aperture comprising a cylindrical segment, said helicoidal surface intersecting said cylindrical segment axially inwardly of said outer surface in an axially and circumferentially inclined edge, a helical rib swaged out of said cylindrical segment, said rib being spaced axially inwardly from said axially and circumferentially inclined edge, said rib being axially and circumferentially inclined in the same sense as said edge with its radial height in substantial direct proportion to its distance from said edge.

2. A female fastener structure having an aperture for rotatably receiving a shank inserted therein, and comprising an end face transversely of said aperture having an outer surface and a helicoidal surface radially inward of said outer surface and intersecting the wall of said aperture axially inwardly from said outer surface, said wall having an axial slot therein, the line of intersection of said helicoidal surface and wall lying on a helical curve which extends axially inwardly from one end adjacent one edge of said slot, and a rib on the wall of said aperture extending from said slot and spaced axially inwardly from said line of intersection of said wall and helicoidal surface and inclined axially in the same sense as said line of intersection, said rib being formed from material swaged from said wall, the height of said rib at any point being in substantial direct proportion to its distance from said line of intersection and having an end intersecting said one edge of said slot and forming a tooth to engage in a groove in said shank upon relative rotation of said structure and shank.

3. A female fastener structure having an aperture for rotatably receiving a shank inserted therein and an end face transverse to said aperture having an outer surface spaced radially from said aperture, the wall of said aperture having a plurality of cylindrical segments, said wall having discontinuities between said segments to space said segments and form edges at the intersections of said segments with said discontinuities, a plurality of axially and circumferentially inclined helicoidal surfaces on the end face of said structure bordering said aperture radially inward of said outer surface, each said surface extending along and intersecting a cylindrical segment between successive discontinuities to form a helical edge extending circumferentially and axially inwardly, a helical rib on each cylindrical segment between successive discontinuities and spaced axially inwardly from each said helical edge and extending circumferentially and axially inwardly in the same sense as the corresponding edge, an end of each of said ribs intersecting a discontinuity to form a cutting tooth at the intersection to cut a groove in said shank upon relative rotation of said structure and shank.

4. A fastener structure as claimed in claim 3, in which said helicoidal surfaces on the end face lie in one helicoidal surface and the helical ribs lie on a single helical curve, so that said helical ribs cut and travel in a single groove on said shank.

5. A female fastener structure having an aperture for rotatably receiving a shank inserted therein and an end face having an outer surface transverse to said aperture, said aperture having a cylindrical wall and said end face bordering said aperture comprising a helicoidal surface radially inward of said outer surface intersecting said wall axially inwardly of said outer surface and axially and circumferentially inclined, and a plurality of helical ribs swaged from said wall axially inwardly of and spaced from said helicoidal surface to provide cutting teeth on the ends of said ribs radially inward of said cylindrical wall, the radial height of said ribs and teeth being in substantial direct proportion to the distance from said helicoidal surface.

6. A female fastener structure having an aperture for rotatably receiving a shank inserted therein and end faces transverse to said aperture at the opposite ends, each end face having an outer surface and a helicoidal surface radially inwardly of said outer surface, the wall of said aperture intersecting each of said helicoidal surfaces in an axially and circumferentially inclined edge, a helical rib on said wall spaced axially inwardly from each of said inclined edges and of the same length as the corresponding edge and formed from displaced material of said wall, each rib being axially and circumferentially inclined in the same sense as its corresponding inclined edge, said ribs on the said wall lying in the same helical curve so as to travel in the same groove on said shank.

7. A fastener structure as claimed in claim 6, in which the helicoidal surface at one end is axially inward of the outer surface and the helicoidal surface at the opposite end is axially outward of the outer surface.

8. A fastener as claimed in claim 6, in which the wall has an axial slot and each of said ribs has an end intersecting said slot to form a cutting tooth, one of the ribs at one end being of greater radial height than the rib at the other end, so that the one of said ribs will cut deeper into the groove cut by said rib at the other end.